United States Patent
Haeri

(10) Patent No.: US 7,793,294 B2
(45) Date of Patent: Sep. 7, 2010

(54) SYSTEM FOR SCHEDULING TASKS WITHIN AN AVAILABLE SCHEDULE TIME PERIOD BASED ON AN EARLIEST POSSIBLE END TIME OF THE TASK

(75) Inventor: Bijan Haeri, Hawthorne, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 1599 days.

(21) Appl. No.: 11/062,726

(22) Filed: Feb. 22, 2005

(65) Prior Publication Data

US 2006/0190943 A1 Aug. 24, 2006

(51) Int. Cl.
G06F 9/46 (2006.01)
(52) U.S. Cl. ....................... 718/102; 718/103
(58) Field of Classification Search ................. 718/102, 718/103
See application file for complete search history.

(56) References Cited

U.S. PATENT DOCUMENTS

| | | | |
|---|---|---|---|
| 4,896,269 A * | 1/1990 | Tong | 700/101 |
| 5,848,403 A | 12/1998 | Gabriner et al. | |
| 5,943,652 A | 8/1999 | Sisley et al. | |
| 6,233,493 B1 | 5/2001 | Cherneff et al. | |
| 6,456,996 B1 | 9/2002 | Crawford et al. | |
| 6,578,005 B1 | 6/2003 | Lesaint et al. | |
| 6,606,529 B1 | 8/2003 | Crowder, Jr. et al. | |
| 7,451,447 B1 * | 11/2008 | Deshpande | 718/102 |
| 7,487,105 B2 * | 2/2009 | Jacobs et al. | 705/8 |
| 2003/0018762 A1 | 1/2003 | Mullen | |
| 2003/0037091 A1 * | 2/2003 | Nishimura et al. | 709/103 |
| 2003/0041087 A1 | 2/2003 | Pothos et al. | |
| 2004/0059451 A1 * | 3/2004 | Holtan et al. | 700/100 |
| 2004/0199415 A1 | 10/2004 | Ho | |
| 2004/0236503 A1 | 11/2004 | Lyakir et al. | |
| 2006/0165029 A1 * | 7/2006 | Melpignano et al. | 370/328 |

FOREIGN PATENT DOCUMENTS

WO WO 01/69488 A1 9/2001

* cited by examiner

Primary Examiner—Meng-Ai An
Assistant Examiner—Camquy Truong
(74) Attorney, Agent, or Firm—Tarolli, Sundheim, Covell & Tummino LLP

(57) ABSTRACT

A system and method for scheduling tasks is disclosed. One embodiment comprises a system that includes an initial scheduler that schedules a plurality of tasks of an associated priority group within an available schedule time period based on an earliest possible end time of a task duration of a respective task, such that tasks that have a task duration that overlap task durations of scheduled tasks are unscheduled tasks. The system further includes a reintroduction scheduler that moves scheduled tasks within respective task time ranges to create time interval gaps for the unscheduled tasks, wherein an unscheduled task is scheduled by the reintroduction scheduler if an unscheduled task has a task duration that falls within an available time interval gap and a task time range that overlaps the available time interval gap.

15 Claims, 6 Drawing Sheets

US 7,793,294 B2

SYSTEM FOR SCHEDULING TASKS WITHIN AN AVAILABLE SCHEDULE TIME PERIOD BASED ON AN EARLIEST POSSIBLE END TIME OF THE TASK

TECHNICAL FIELD

The present invention relates generally to scheduling, and more particularly to a system and a method for scheduling tasks.

BACKGROUND

Computer implemented planning and scheduling systems are widely used for transportation, manufacturing, resource allocation, and supply planning functions. In general, such systems can schedule resources for implementing tasks based on a set of constraints associated with each task, and an available schedule time period that the resources will be available. For example, each task may need a set of specific resources that its needs to use within a specific task time range. A scheduling system will determine which tasks are scheduled, and the scheduling time interval within the scheduled time period for the scheduled tasks. Since there are limited resources available for a limited time period, many tasks remain unscheduled. However, time intervals that are less than the time duration of unscheduled tasks remain available. Therefore, full utilization of the available resources for the available schedule time period is not achieved.

In an auction based scheduling algorithm, each task is assigned value points. A user associated with the task can bid on resources and/or time intervals associated with an available schedule time period. The user that bids the most value points on a given resource and/or time interval is assigned the given resource and/or time interval. The users that are outbid will have to bid on other resources and/or time intervals for the associated tasks. However, if the remaining resources and/or time intervals are outside the set of constraints associated with a given task, the task will remain unscheduled, while time intervals within the available schedule time period still remain.

SUMMARY

The present invention relates to a system and method for scheduling tasks. One embodiment comprises a system that includes an initial scheduler that schedules a plurality of tasks of an associated priority group within an available schedule time period based on an earliest possible end time of a task duration of a respective task, such that tasks that have a task duration that overlap task durations of scheduled tasks are unscheduled tasks. The system further includes a reintroduction scheduler that moves scheduled tasks within respective task time ranges to create time interval gaps for the unscheduled tasks, wherein an unscheduled task is scheduled by the reintroduction scheduler if an unscheduled task has a task duration that falls within an available time interval gap and a task time range that overlaps the available time interval gap.

Another embodiment of the present invention relates to a computer readable medium having computer executable components. The computer executable components comprise a priority group selector algorithm that sequentially provides task priority groups based on higher priority to lower priority task priority groups. The computer executable components further comprise a greedy algorithm that schedules a plurality of tasks of an associated priority group within an available schedule time period based on an earliest possible end time of a task duration of a respective task. The computer executable components further comprise a reintroduction scheduler algorithm that receives schedule tasks and unscheduled tasks from the greedy algorithm. The reintroduction scheduler algorithm determines if scheduled tasks can be shifted within associated task time ranges to create time interval gaps for the unscheduled tasks, wherein an unscheduled task is scheduled by the reintroduction scheduler if an unscheduled task has a task duration that falls within an available time interval gap and a task time range that overlaps the available time interval gap.

Another embodiment of the invention relates to a method for scheduling tasks. The method comprises assigning priorities to tasks defining a plurality of task priority groups, selecting a task priority group from the plurality of task priority groups, and scheduling tasks within an available schedule time period from the selected task priority group based on an earliest possible end time of a task duration of each associated task. The method further comprises reintroducing unscheduled tasks of the selected task priority group by moving scheduled tasks within respective task time ranges to create time interval gaps to create a revised schedule, wherein an unscheduled task is scheduled if an unscheduled task has a task duration that falls within an available time interval gap and a task time range that overlaps the available time interval gap.

DETAILED DESCRIPTION

The present invention relates to a system and method for scheduling tasks. The tasks can be tasks associated with manufacturing, shipping, transportation, resource allocation, bandwidth allocation, sensors or a variety of other task types. The system and method schedule tasks based on priority constraints. Each task is assigned a predetermined priority (e.g., highest priority, middle priority, lowest priority) defining a plurality of task priority groups. Additionally, each task has a task duration constraint and a task time range constraint. The task duration constraint is the amount of time that it will take for the task to be completed based on possible start times and possible end times, and the task time range constraint is the allowable window or range of time for performing the task. The task time range is greater than or equal to the task duration.

In one aspect of the invention, a group of tasks having a predetermined first priority (e.g., a highest priority task) are assigned time intervals within an available schedule time period by an initial scheduler based on an earliest possible end time associated with its respective task duration. For example, the initial scheduler can schedule tasks based on the earliest possible end times, until all tasks with task durations that do not overlap are scheduled. The scheduled tasks and the unscheduled tasks are provided to a reintroduction scheduler.

The reintroduction scheduler determines if the scheduled tasks can be moved within a task window or time range to provide time interval gaps, so that unscheduled tasks of a given priority can be scheduled within the time interval gaps. The initial scheduling and reintroduction scheduling is repeated for task groups of a next priority, until an attempt has been made to schedule tasks of each task priority group.

Figure 1:
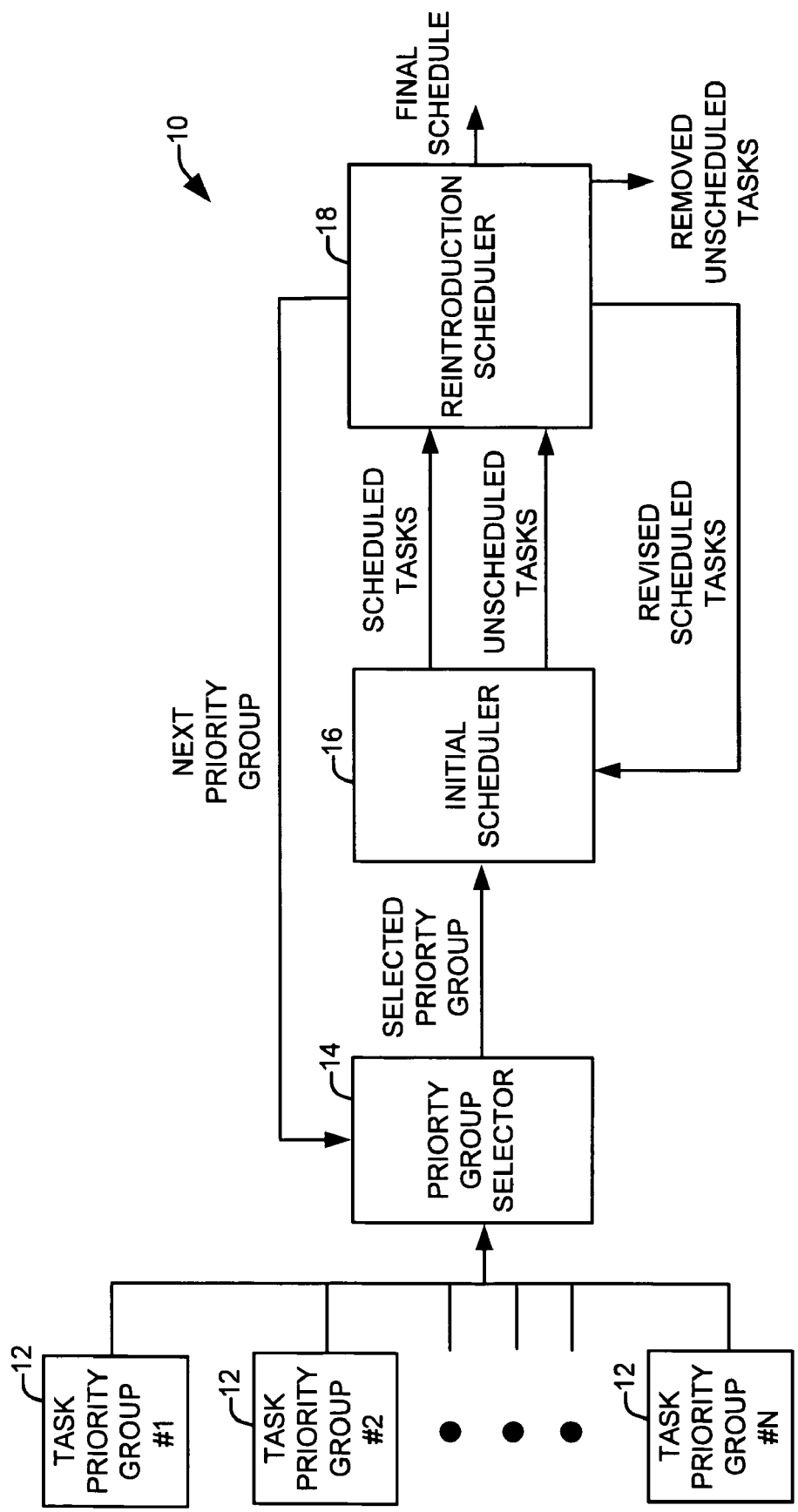
FIG. 1 illustrates a block diagram of a system for scheduling tasks in accordance with an aspect of the present invention.

FIG. 1 illustrates a scheduling system 10 for scheduling a plurality of tasks in accordance with an aspect of the present invention. The scheduling system 10 can be implemented in software, hardware or a combination thereof. The scheduling system 10 can be, for example, a computer system or software algorithms that execute on a computer readable medium. The scheduling system 10 includes a plurality of task priority groups 12 labeled task priority group #1 through task priority group #N, where N is an integer greater than or equal to one. The scheduling system includes a priority group selector 14 that selects tasks of a given priority to provide to an initial scheduler 16. For example, the priority group selector 14 selects tasks from a first priority group (e.g., task priority group #1), which may be tasks that have been defined as tasks of a highest priority.

The initial scheduler 16 schedules tasks of the first priority group based on the earliest possible end times of a task duration associated with a given task, until all tasks that have task durations that do not overlap based on earliest possible end times are scheduled. The initial scheduler 16 can employ a best-first technique, such as a greedy algorithm, where the best task is the task that has the earliest possible end time. The remaining tasks that have task durations that overlap scheduled tasks are unscheduled tasks.

The scheduled tasks and the unscheduled tasks are provided to a reintroduction scheduler 18. The reintroduction scheduler 18 determines if the scheduled tasks can be moved within a task window or time range to provide time interval gaps, so that unscheduled tasks of the first priority group having task durations less than the time interval gaps with task time ranges that overlap the time interval gaps can be scheduled within the time interval gaps. A revised schedule of tasks is provided to the initial scheduler 16 that includes any reintroduced previous unscheduled tasks that have now been scheduled associated with the first priority group. Any remaining unscheduled tasks of the first priority group are then removed. The reintroduction scheduler 18 provides a next priority group indication to the priority group selector 14. The priority group selector 14 then provides tasks associated with a second task priority group (e.g., task priority group #2), such as tasks of a next lower priority than the first task priority group to the initial scheduler 16.

The initial scheduler 16 attempts to schedule tasks associated with the second task priority group into the revised schedule of tasks that includes tasks scheduled from the first priority group. The initial scheduler 16 schedules tasks of the second priority group based on the earliest possible end times and the task duration into appropriate available time intervals in the revised schedule of tasks, until all tasks from the second task priority group that have task durations that do not overlap scheduled tasks of the first task priority group and the second task priority group are scheduled. The remaining tasks of the second priority group that have task durations that overlap scheduled tasks of the first task priority group and the second task priority group are unscheduled tasks.

The scheduled tasks of the first priority group and the second priority group and the unscheduled tasks of the second priority group are provided to the reintroduction scheduler 18. The reintroduction scheduler 18 determines if the scheduled tasks of the first priority group and the second priority group can be moved within a task window or time range associated with a given task to provide time interval gaps, so that unscheduled tasks of the second priority can be scheduled within the time interval gaps. A revised schedule of tasks is provided to the initial scheduler 16 that includes any reintroduced unscheduled tasks that have now been scheduled associated with the second task priority group. Any remaining unscheduled tasks of the second priority group are then removed. The reintroduction scheduler 18 provides a next priority group indication to the priority group selector 14. The priority group selector 14 can then provide tasks associated with a next task priority group (e.g., tasks of a next lower priority) to the initial scheduler 16.

The process of selecting tasks of a priority group, initial scheduling of the tasks of the selected priority group in time intervals of the available schedule time period, and reintroducing tasks of the selected priority group is repeated for each of the N task priority groups. Once the process is completed on each task priority group, the scheduling system 10 can generate a final schedule that includes each task and its associated start time and end time within the available schedule time period.

Figure 2:
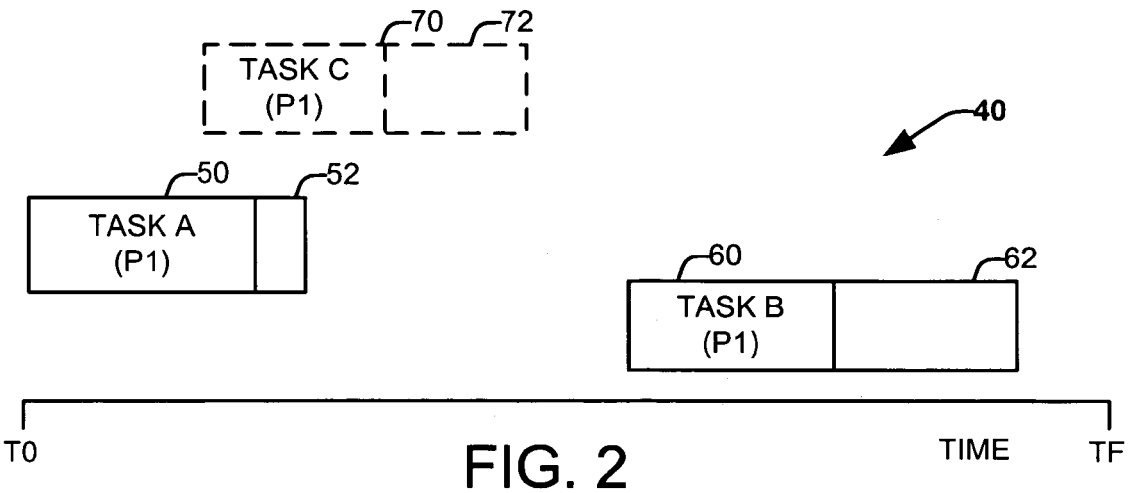
FIGS. 2-7 illustrate scheduling of tasks of different priorities within an available schedule time period employing the system of FIG. 1.

FIGS. 2-7 illustrate scheduling of tasks of different priorities within an available schedule time period 40 employing the system 10 illustrated in FIG. 1. The available schedule time period 40 begins at time T0 and ends at time TF. The priority group selector 14 provides a task priority group (P1) to the initial scheduler 16. The task priority group P1 includes a task A of a task duration 50 with a task time range 52, a task B of a task duration 60 with a task time range 62, and a task C of a task duration 70 with a task time range 72. As illustrated in FIG. 2, the initial scheduler 16 schedules task A and task B based on the earliest possible end times of the respective task duration. However, task C remains unscheduled since the beginning of its task duration 70 overlaps with the task duration 50 of task A based on its earliest possible end time. The scheduled tasks and the unscheduled tasks of the first priority group P1 are then provided to the reintroduction scheduler 18.

Figure 3:
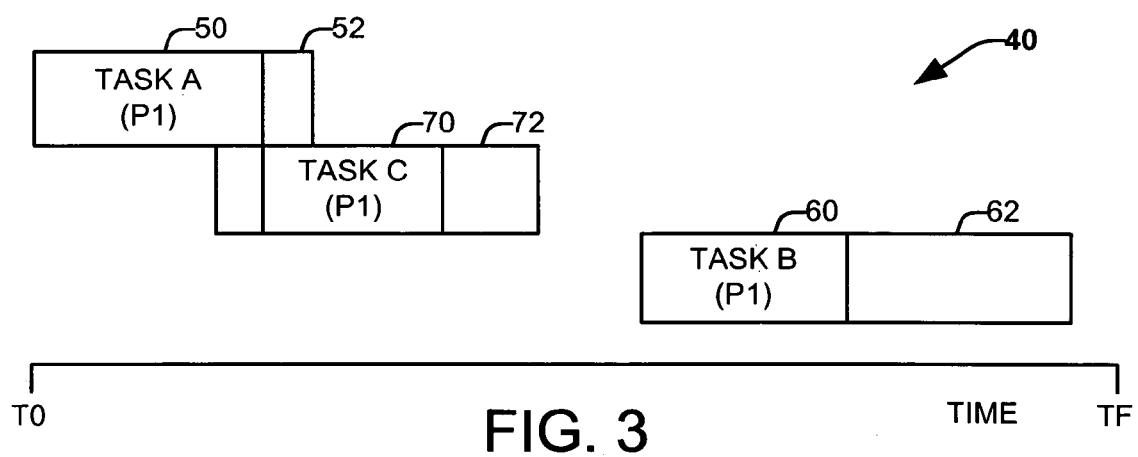
Figure 4:
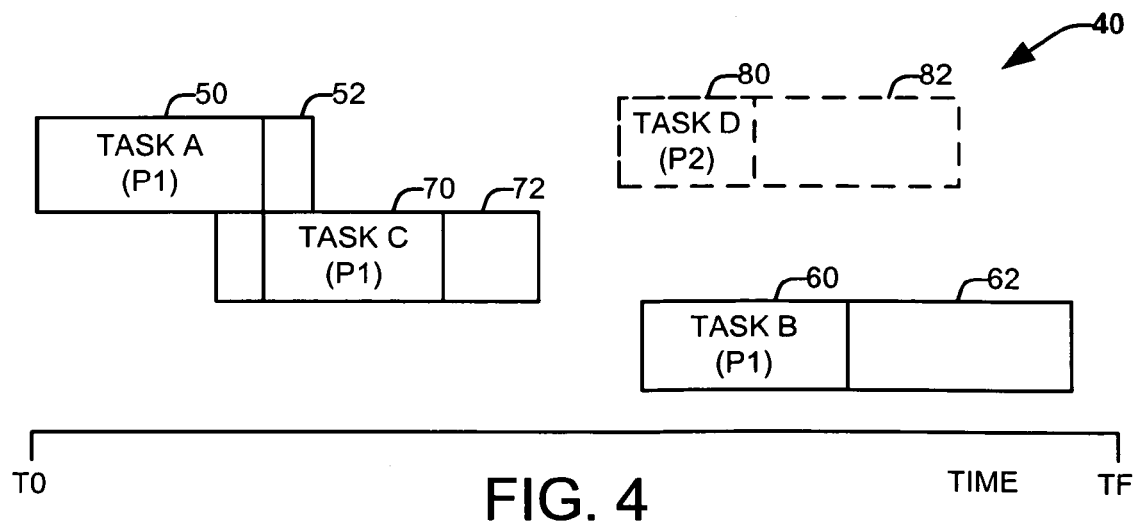

As illustrated in FIG. 3, the reintroduction scheduler 18 moves the task duration 70 of unscheduled task C within its task time range 72, so that the task duration 70 of task C has a start time that begins after an end time of the task duration 50 of scheduled task A. The revised schedule is then provided to the initial scheduler 16. The priority group selector 14 provides a task priority group (P2) to the initial scheduler 16. The task priority group P2 includes a task D having a task duration 80 with a task time range 82. As illustrated in FIG. 4, the initial scheduler 16 cannot schedule task D since the earliest possible end time of its task duration 80 overlaps with the task duration 60 of task B of the first priority group P1. The scheduled tasks of the first priority group P1 and the unscheduled task of the second priority P2 are then provided to the reintroduction scheduler 18.

Figure 5:
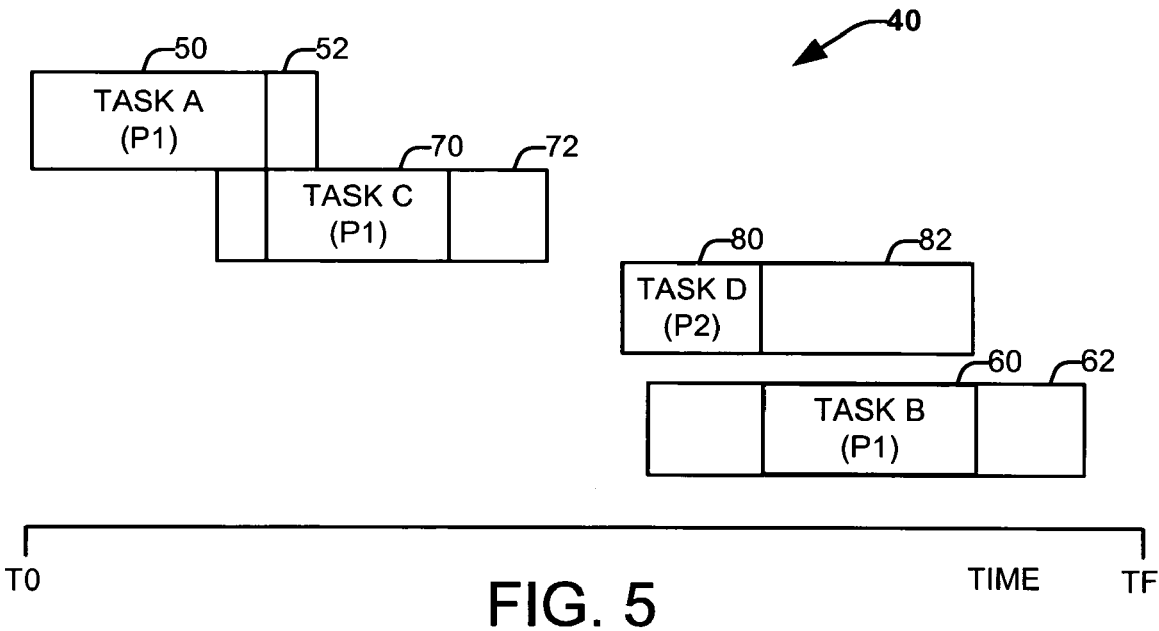
Figure 6:
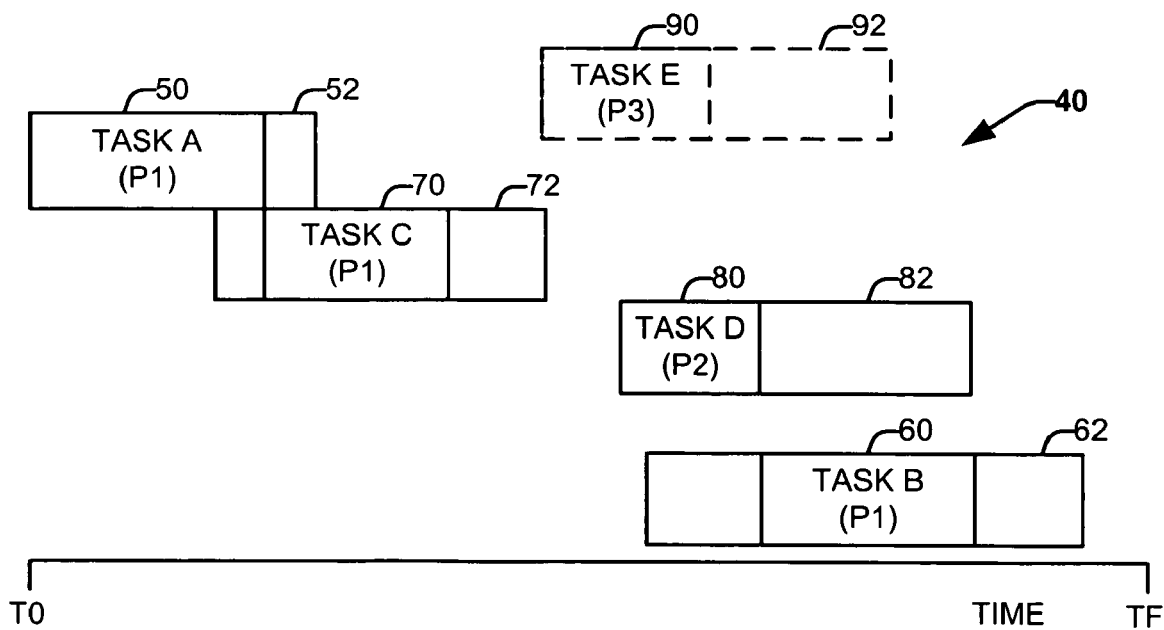

As illustrated in FIG. 5, the reintroduction scheduler 18 moves the task duration 60 of scheduled task B within its task time range 62, so that the task D has an end time of its task duration 80 that ends before a start time of the task duration 60 of scheduled task B. Alternatively, the reintroduction scheduler 18 could move the task duration 80 of unscheduled task D within its task time range 82, so that the task D has a start time of its task duration 80 that begins after an end time of the task duration 60 of scheduled task B. The revised schedule is then provided to the initial scheduler 16. The priority group selector 14 provides a task priority group (P3) to the initial scheduler 16. The task priority group P3 includes a task E having a task duration 90 with a task time range 92. As illustrated in FIG. 6, the initial scheduler 16 cannot schedule task E since the end time of its task duration 90 overlaps with the task duration 80 of scheduled task D of the second priority group P2. The scheduled tasks of the first priority group P1 and second priority group P2 and the unscheduled task of the third priority P3 are then provided to the reintroduction scheduler 18.

Figure 7:
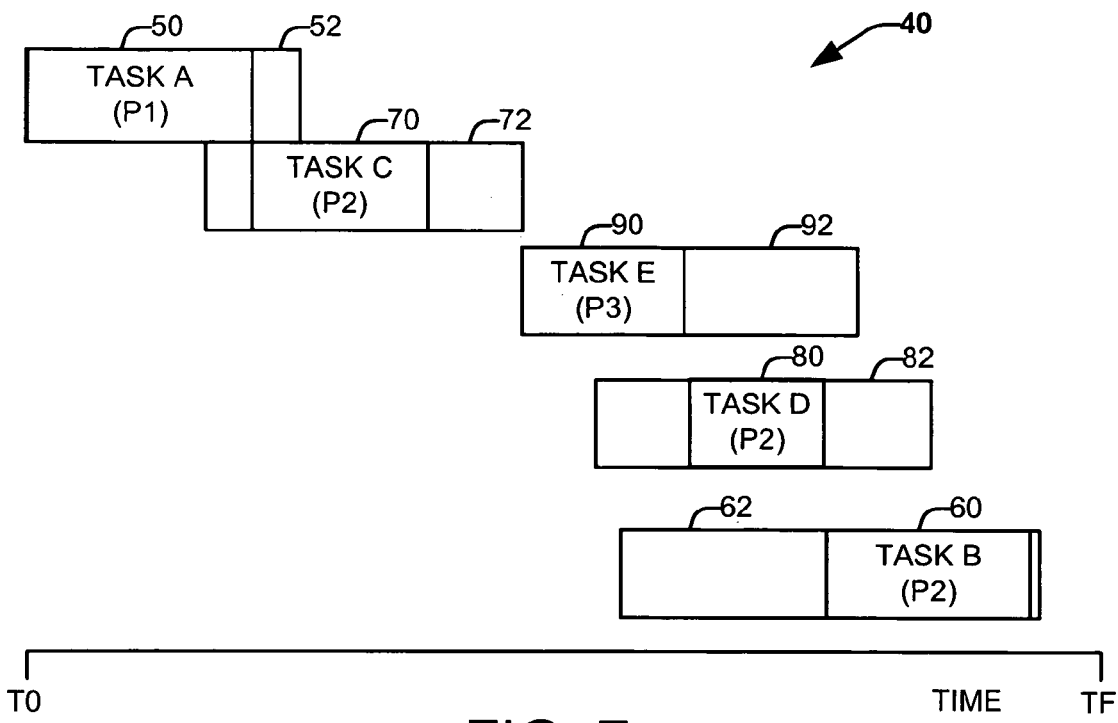

As illustrated in FIG. 7, the reintroduction scheduler 18 moves the task duration 60 of scheduled task B within its task time range 62, and moves the task duration 80 of scheduled task D within its task range 82, so that the task E has a task duration 90 with an end time that ends before a start time of a task duration 80 of scheduled task D. Additionally, this removes any overlap between task D and task B, since task D has a task duration 80 with an end time that ends before a start time of the task duration 60 of task B. Assuming that there is not any additional priority task groups to schedule, the scheduling system 10 will output the final schedule with tasks A-E scheduled within the available schedule time period 40. It is to be appreciated that the tasks A-E of FIGS. 2-7 are provided for illustrative purposes, and that the scheduling system 10 can be employed to schedule hundreds or thousands of tasks.

Figure 8:
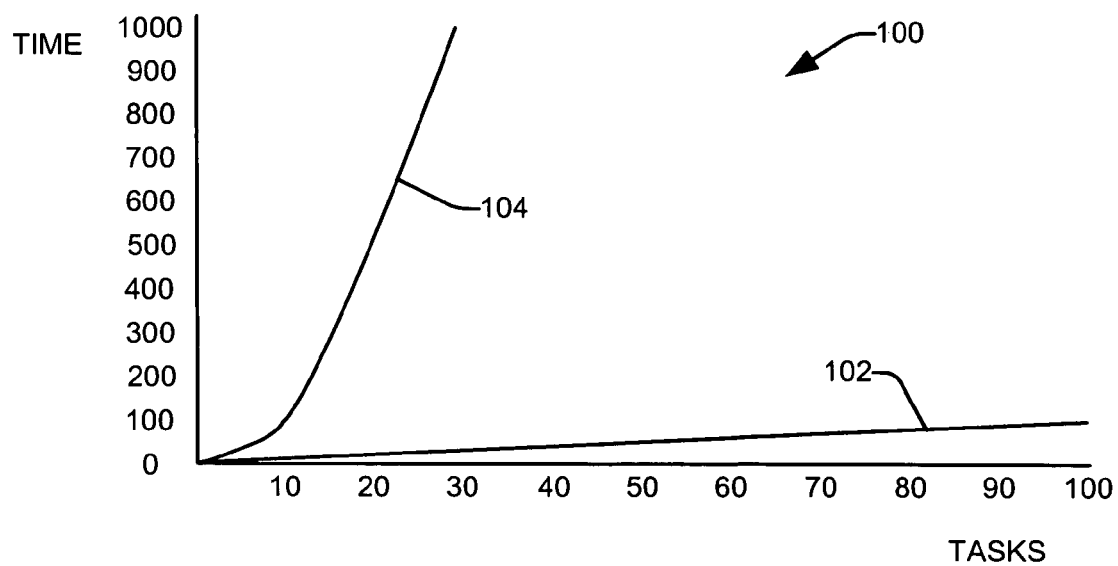
FIG. 8 illustrates a graph of execution units of time for scheduling tasks versus the number of tasks to be scheduled.

FIG. 8 illustrates a graph 100 of execution units of time for scheduling tasks versus the number of tasks to be scheduled. The execution units of time, for example, can be based on a clock cycle time period associated with a processor executing instruction on a computer system, and can be in microseconds, nanoseconds or picoseconds. The graph 100 illustrates a first line or curve 102 associated with scheduling of tasks employing the scheduling system of the present invention versus a second line 104 associated with scheduling tasks employing a conventional scheduler system. As illustrated in the second line 104 of the graph, the execution units of time associated with scheduling tasks employing a conventional scheduler system has a N2 relationship, where N is the number of tasks, such that the number of execution units of time required to schedule tasks is substantially equal to the number of tasks squared.

As illustrated in the first line 102 of the graph, the execution units of time associated with scheduling tasks employing the scheduler system of the present invention has a linear relationship, such that the number of execution units of time required to schedule tasks is substantially equal to the number of tasks to be scheduled. For example, employing the scheduler system of the present invention for scheduling 1,000 tasks will take approximately 1,000 units of execution time, while employing a conventional scheduler to schedule 1,000 tasks will take approximately 1,000,000 units of execution time. Therefore, as the number of tasks to be scheduled increases, the execution time savings associated with employing the scheduler system of the present invention substantially increases.

Figure 9:
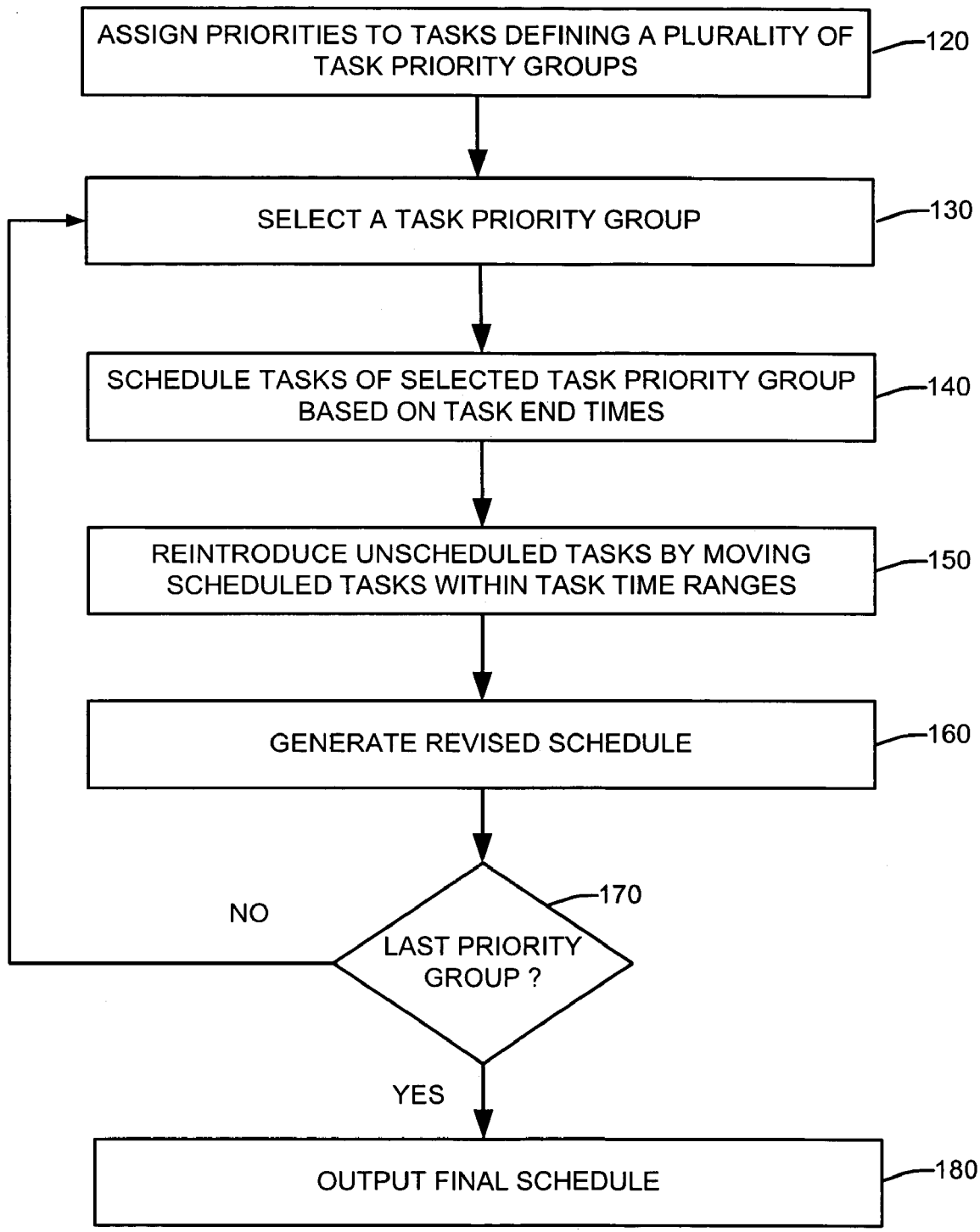
FIG. 9 illustrates a methodology for scheduling tasks in accordance with an aspect of the present invention.

In view of the foregoing structural and functional features described above, a method will be better appreciated with reference to FIG. 9. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., a computer or a computer network as one or more integrated circuits or circuit boards containing one or more microprocessors), software (e.g., as executable instructions running on one or more processors of a computer system), or any combination thereof.

FIG. 9 illustrates a methodology for scheduling tasks in accordance with an aspect of the present invention. The methodology begins at 120 where a plurality of tasks are assigned priorities defining a plurality of task priority groups of varying priority (e.g., high priority, medium priority, low priority). Each task includes a task duration constraint and a task time range constraint. At 130, the methodology selects tasks from a selected task priority group. For example, task priority groups can be selected based on highest priority to lowest priority in sequential order, such that higher priority tasks are scheduled before lower priority tasks employing a priority group selector algorithm. The methodology then proceeds to 140.

At 140, tasks associated with the selected task priority group are scheduled based on tasks that have task durations with the earliest possible end time, such that tasks with the earliest possible end time are scheduled first. For example, a best-first scheduler can be employed, such as a greedy algorithm that schedules tasks based on the earliest possible end times. Tasks that have a task duration (e.g., based on its earliest possible end time and corresponding start time) that overlap tasks that have been scheduled remain unscheduled. At 150, an attempt is made to reintroduce the unscheduled tasks into the schedule by moving scheduled tasks within respective task time ranges. For example, a reintroduction algorithm can be employed that determines which tasks can be shifted based on the task duration and task time range to create time interval gaps within the scheduled tasks that allow for the scheduling of the unscheduled tasks based on the task duration and task time range of the unscheduled tasks. The unscheduled tasks that can be scheduled are then scheduled into available time interval gaps. The remaining unscheduled tasks are removed. At 160, a revised schedule is generated. The methodology then proceeds to 170.

At 170, the methodology determines if there are any additional priority groups to be scheduled or if an attempt has been made to schedule the last priority group. If an attempt has been made to schedule the last priority group (YES), the methodology proceeds to 180 to output a final schedule. If an attempt has not been made to schedule the last priority group (NO), the methodology returns to 130 to select another task priority group for scheduling. The methodology schedules tasks associated with the subsequently selected task priority group in the revised schedule that includes schedule tasks of one or more other priority groups based on earliest possible end times of the associated task duration of the tasks at 140. The methodology then reintroduces the unscheduled tasks of the subsequently selected priority groups by moving schedule tasks within respective task time ranges. A new revised schedule is generated in 160. The methodology repeats the steps of 130-170 until an attempt has been made to initially schedule and reintroduce task from each task priority group.

Figure 10:
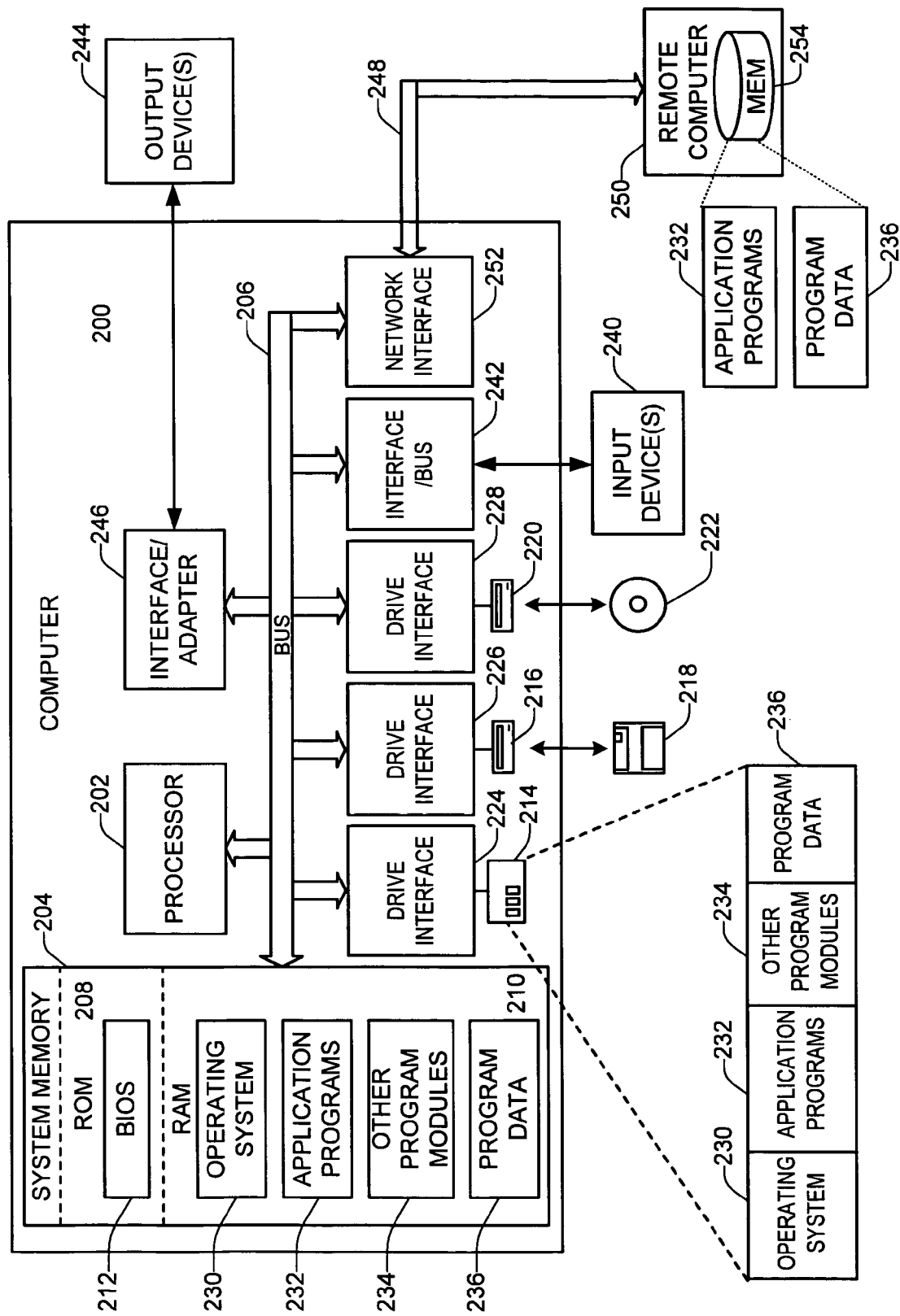
FIG. 10 illustrates an embodiment of a computer system.

FIG. 10 illustrates a computer system 200 that can be employed to implement systems and methods described herein, such as based on computer executable instructions running on the computer system. The computer system 200 can be implemented on one or more general purpose networked computer systems, embedded computer systems, routers, switches, server devices, client devices, various intermediate devices/nodes and/or stand alone computer systems. Additionally, the computer system 200 can be implemented as part of the computer-aided engineering (CAE) tool running computer executable instructions to perform a method as described herein.

The computer system 200 includes a processor 202 and a system memory 204. A system bus 206 couples various system components, including the system memory 204 to the processor 202. Dual microprocessors and other multi-processor architectures can also be utilized as the processor 202. The system bus 206 can be implemented as any of several types of bus structures, including a memory bus or memory controller, a peripheral bus, and a local bus using any of a variety of bus architectures. The system memory 204 includes read only memory (ROM) 208 and random access memory (RAM) 210. A basic input/output system (BIOS) 212 can reside in the ROM 208, generally containing the basic routines that help to transfer information between elements within the computer system 200, such as a reset or power-up.

The computer system 200 can include a hard disk drive 214, a magnetic disk drive 216, e.g., to read from or write to a removable disk 218, and an optical disk drive 220, e.g., for reading a CD-ROM or DVD disk 222 or to read from or write to other optical media. The hard disk drive 214, magnetic disk drive 216, and optical disk drive 220 are connected to the system bus 206 by a hard disk drive interface 224, a magnetic disk drive interface 226, and an optical drive interface 228, respectively. The drives and their associated computer-readable media provide nonvolatile storage of data, data structures, and computer-executable instructions for the computer system 200. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like.

A number of program modules may also be stored in one or more of the drives as well as in the RAM 210, including an operating system 230, one or more application programs 232, other program modules 234, and program data 236.

A user may enter commands and information into the computer system 200 through user input device 240, such as a keyboard, a pointing device (e.g., a mouse). Other input devices may include a microphone, a joystick, a game pad, a scanner, a touch screen, or the like. These and other input devices are often connected to the processor 202 through a corresponding interface or bus 242 that is coupled to the system bus 206. Such input devices can alternatively be connected to the system bus 206 by other interfaces, such as a parallel port, a serial port or a universal serial bus (USB). One or more output device(s) 244, such as a visual display device or printer, can also be connected to the system bus 206 via an interface or adapter 246.

The computer system 200 may operate in a networked environment using logical connections 248 to one or more remote computers 250. The remote computer 250 may be a workstation, a computer system, a router, a peer device or other common network node, and typically includes many or all of the elements described relative to the computer system 200. The logical connections 248 can include a local area network (LAN) and a wide area network (WAN).

When used in a LAN networking environment, the computer system 200 can be connected to a local network through a network interface 252. When used in a WAN networking environment, the computer system 200 can include a modem (not shown), or can be connected to a communications server via a LAN. In a networked environment, application programs 232 and program data 236 depicted relative to the computer system 200, or portions thereof, may be stored in memory 254 of the remote computer 250.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for scheduling tasks, the system comprising:
memory for storing computer executable instructions;
a processor for accessing memory and executing computer executable instructions, the computer executable instructions comprising:
an initial scheduler that schedules a plurality of tasks of an associated priority group within an available schedule time period based on an earliest possible end time of a task duration of a respective task of the plurality of tasks, such that tasks of the plurality of tasks that have a task duration that overlap task durations of scheduled tasks are not scheduled and are defined as unscheduled tasks;
a reintroduction scheduler that moves scheduled tasks within respective task time ranges to create time interval gaps for the unscheduled tasks, wherein an unscheduled task is scheduled by the reintroduction scheduler if an unscheduled task has a task duration that falls within an available time interval gap; and
a priority group selector that selects tasks with a same predefined priority from a plurality of priority groups for providing task of a first priority group to the initial scheduler;
wherein the reintroduction scheduler provides an indication for a next priority group to the priority group selector and a revised schedule of tasks to the initial scheduler, the priority group selector selecting a next group of tasks with a same priority for providing a second priority group to the initial scheduler, the initial scheduler schedules a plurality of tasks of the second priority group within available time intervals of the revised schedule of tasks based on an earliest possible end time of a task duration of a respective task of the second priority group, such that tasks that have a task duration that overlap task durations of scheduled tasks of the first and second priority group are unscheduled tasks of the second priority group.

2. The system of claim 1, wherein the reintroduction scheduler moves scheduled tasks within respective task time ranges of the scheduled tasks of the first and second priority group to create time interval gaps in the revised schedule for the unscheduled tasks of the second priority group, wherein an unscheduled task of the second priority group is scheduled by the reintroduction scheduler if an unscheduled task of the second priority group has a task duration that falls within an available time interval gap of the revised schedule.

3. The system of claim 1, wherein the initial scheduler schedules a plurality of tasks of an associated priority group, and the reintroduction scheduler attempts to schedule unscheduled tasks of an associated priority group sequentially for N task priority groups, where N is an integer greater than or equal to one.

4. The system of claim 3, a wherein the priority group selector sequentially provides task priority groups to the initial scheduler based on higher priority task priority groups to lower priority task priority groups.

5. The system of claim 1, wherein the initial scheduler is a best first scheduler, wherein a best task is a task that has an earliest possible end time associated with its respective task duration.

6. The system of claim 1, wherein the initial scheduler is a greedy algorithm.

7. The system of claim 1, wherein the reintroduction scheduler removes unscheduled tasks that cannot be scheduled into time interval gaps.

8. A computer readable medium having computer executable components comprising:
- a priority group selector algorithm that sequentially provides task priority groups from a plurality of task priority groups based on higher priority to lower priority task priority groups;
- a greedy algorithm that schedules a plurality of tasks of an associated priority group of the plurality of task priority groups within an available schedule time period based on an earliest possible end time of a task duration of a respective task, such that tasks of the plurality of tasks that have a task duration that overlap task durations of scheduled tasks are not scheduled and are defined as unscheduled tasks; and
- a reintroduction scheduler algorithm that receives schedule tasks and unscheduled tasks from the greedy algorithm, the reintroduction scheduler algorithm determines if scheduled tasks can be shifted within associated task time ranges to create time interval gaps for the unscheduled tasks, wherein an unscheduled task is scheduled by the reintroduction scheduler if an unscheduled task has a task duration that falls within an available time interval gap, wherein the reintroduction scheduler algorithm provides an indication for a next priority group to the priority group selector that invokes the priority group selector into providing a task priority group of the next highest priority to the greedy algorithm, and the reintroduction scheduler algorithm provides a revised schedule of tasks to the greedy algorithm and removes unscheduled tasks that cannot be scheduled within any available time interval gaps, the greedy algorithm employing the revised schedule of tasks in scheduling tasks of a task priority group of the next highest priority.

9. The computer readable medium of claim 8, wherein the reintroduction scheduler algorithm generates a final schedule when an attempt has been made to schedule each of a plurality of task priority groups.

10. A computer readable medium having computer executable components comprising:
- a priority group selector algorithm that sequentially provides task priority groups from a plurality of task priority groups based on higher priority to lower priority task priority groups;
- a greedy algorithm that schedules a plurality of tasks of an associated priority group of the plurality of task priority groups within an available schedule time period based on an earliest possible end time of a task duration of a respective task, such that tasks of the plurality of tasks that have a task duration that overlap task durations of scheduled tasks are not scheduled and are defined as unscheduled tasks; and
- a reintroduction scheduler algorithm that receives schedule tasks and unscheduled tasks from the greedy algorithm, the reintroduction scheduler algorithm determines if scheduled tasks can be shifted within associated task time ranges to create time interval gaps for the unscheduled tasks, wherein an unscheduled task is scheduled by the reintroduction scheduler if an unscheduled task has a task duration that falls within an available time interval gap, wherein the reintroduction scheduler algorithm receives schedule tasks of a revised schedule that includes schedule tasks from a plurality of different task priority groups, and unscheduled tasks from a last priority group provided by the priority group selector algorithm to the greedy algorithm, the reintroduction scheduler algorithm determines and schedules unscheduled tasks if scheduled tasks can be shifted within associated task time ranges of the revised schedule to create time interval gaps for the unscheduled tasks associated with the last priority group.

11. A computer readable medium having computer executable instructions for performing a method for scheduling tasks, the method comprising:
- assigning priorities to tasks defining a plurality of task priority groups;
- selecting a task priority group from the plurality of task priority groups;
- scheduling tasks within an available schedule time period from the selected task priority group based on an earliest possible end time of a task duration of each associated task; such that tasks that have a task duration that overlap task durations of scheduled tasks are not scheduled and are defined as unscheduled tasks;
- reintroducing unscheduled tasks of the selected task priority group by moving scheduled tasks within respective task time ranges to create time interval gaps to create a revised schedule, wherein an unscheduled task is scheduled if an unscheduled task has a task duration that falls within an available time interval gap;
- scheduling tasks within the available schedule time period from a second selected task priority group based on an earliest possible end time of a task duration of each respective task of the second selected task priority group and available time intervals within the revised schedule; and
- reintroducing unscheduled tasks of the second selected task priority group by moving scheduled tasks of the selected task priority group and the second selected task priority group within respective task time ranges to create time interval gaps to generate a second revised schedule, wherein an unscheduled task of the second selected task priority group is scheduled if an unscheduled task of the second selected task priority group has a task duration that falls within an available time interval gap.

12. The method of claim 11, wherein the selecting a task priority group, scheduling tasks within an available schedule time period, and the reintroducing unscheduled tasks is repeated for N task priority groups, where N is an integer greater than or equal to one.

13. The method of claim 12, further comprising generating a final output schedule after attempting to schedule tasks from each of the N task priority groups.

14. The method of claim 11, wherein the selecting a task priority group from the plurality of task priority groups comprises sequentially selecting task priority groups from highest priority to lowest priority.

15. The method of claim 11, wherein the scheduling tasks within an available schedule time period from the selected task priority group based on an earliest possible end time of a task duration of each associated task comprises executing a greedy algorithm on the tasks based on task duration and earliest possible end time.

* * * * *